United States Patent
Matsuda

(10) Patent No.: US 12,400,152 B2
(45) Date of Patent: Aug. 26, 2025

(54) ENERGY MANAGEMENT METHOD AND COMPUTER SYSTEM

(71) Applicant: TOYOTA JIDOSHA KABUSHIKI KAISHA, Toyota (JP)

(72) Inventor: Kazuhisa Matsuda, Ebina (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/539,455

(22) Filed: Dec. 14, 2023

(65) Prior Publication Data
US 2024/0303556 A1    Sep. 12, 2024

(30) Foreign Application Priority Data
Mar. 7, 2023 (JP) ................................ 2023-034637

(51) Int. Cl.
| | |
|---|---|
| G06Q 10/02 | (2012.01) |
| B60L 53/62 | (2019.01) |
| B60L 53/68 | (2019.01) |
| G06Q 50/06 | (2024.01) |

(52) U.S. Cl.
CPC .............. *G06Q 10/02* (2013.01); *B60L 53/62* (2019.02); *G06Q 50/06* (2013.01); *B60L 53/68* (2019.02)

(58) Field of Classification Search
CPC ........ G06Q 10/02; G06Q 50/06; B60L 53/62; B60L 53/68
See application file for complete search history.

(56) References Cited

U.S. PATENT DOCUMENTS

| | | | | |
|---|---|---|---|---|
| 2010/0094496 | A1* | 4/2010 | Hershkovitz | B60L 50/66 701/22 |
| 2014/0253036 | A1* | 9/2014 | Kinomura | H02J 7/00047 320/109 |
| 2016/0266561 | A1* | 9/2016 | Oono | B60L 55/00 |
| 2018/0143029 | A1* | 5/2018 | Nikulin | G01C 21/3415 |
| 2019/0092177 | A1* | 3/2019 | Malik | G06Q 50/06 |
| 2019/0143831 | A1* | 5/2019 | Birek | B60L 58/14 701/22 |
| 2021/0394632 | A1* | 12/2021 | McCool | H02J 50/12 |

(Continued)

FOREIGN PATENT DOCUMENTS

JP    2016-171634 A    9/2016

OTHER PUBLICATIONS

Liu, S., Xia, X., Cao, Y., Ni, Q., Zhang, X., & Xu, L. (2021). Reservation-based EV charging recommendation concerning charging urgency policy. Sustainable Cities and Society, 74, 103150. https://doi.org/10.1016/j.scs.2021.103150 (Year: 2021).*

*Primary Examiner* — Shannon S Campbell
*Assistant Examiner* — Manal A. Alsamiri
(74) *Attorney, Agent, or Firm* — SoraIP, Inc.

(57) ABSTRACT

An energy management method includes scheduling charging of an electrified vehicle for energy management to be performed at a predetermined charging point on a predetermined execution date, and pre-charging action of the electrified vehicle on the execution date at a location other than the charging point. When detected, determine whether the electrified vehicle can reach the charging point without charging and determine that the electrified vehicle can reach the charging point without charging at a location other than the charging point and requiring users of the electrified vehicle not to charge at locations other than at the charging point if so requested.

4 Claims, 6 Drawing Sheets

(56) References Cited

U.S. PATENT DOCUMENTS

| | | | |
|---|---|---|---|
| 2023/0266138 A1* | 8/2023 | Yang | G01C 21/3469 |
| | | | 701/423 |
| 2024/0142247 A1* | 5/2024 | Ropel | B60L 58/16 |

* cited by examiner

FIG. 2
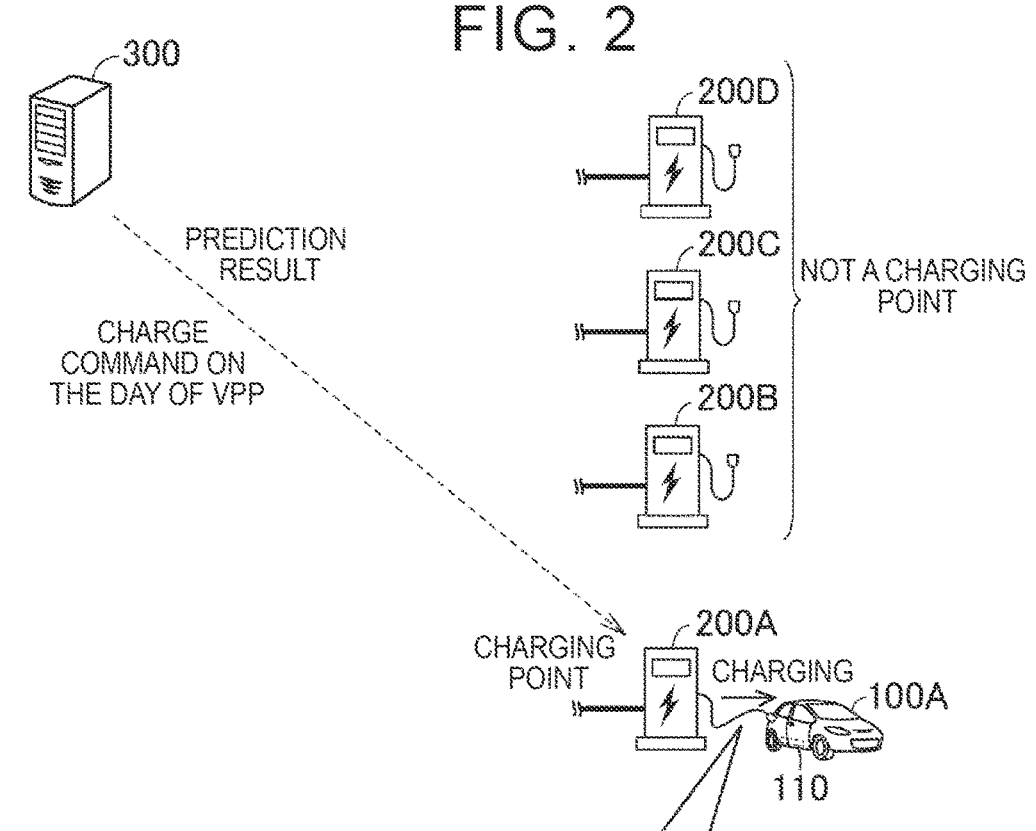
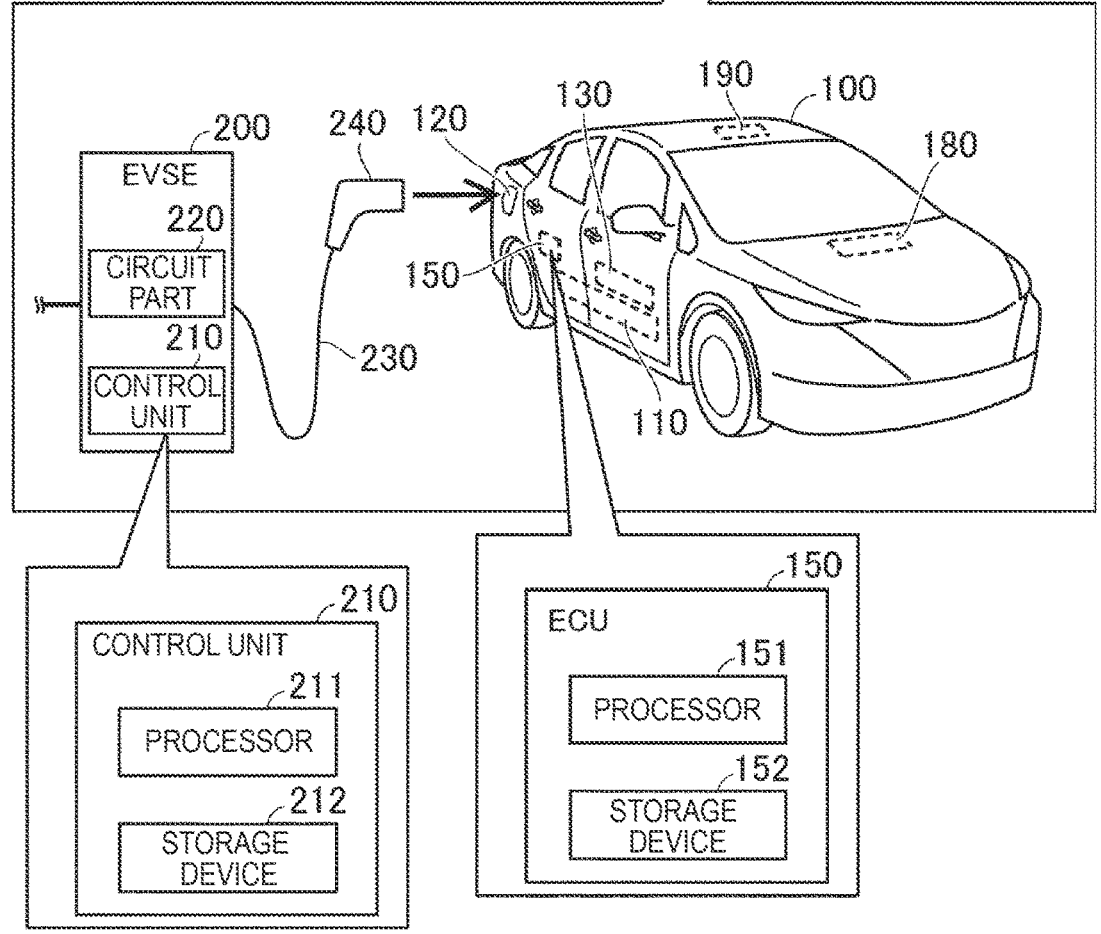

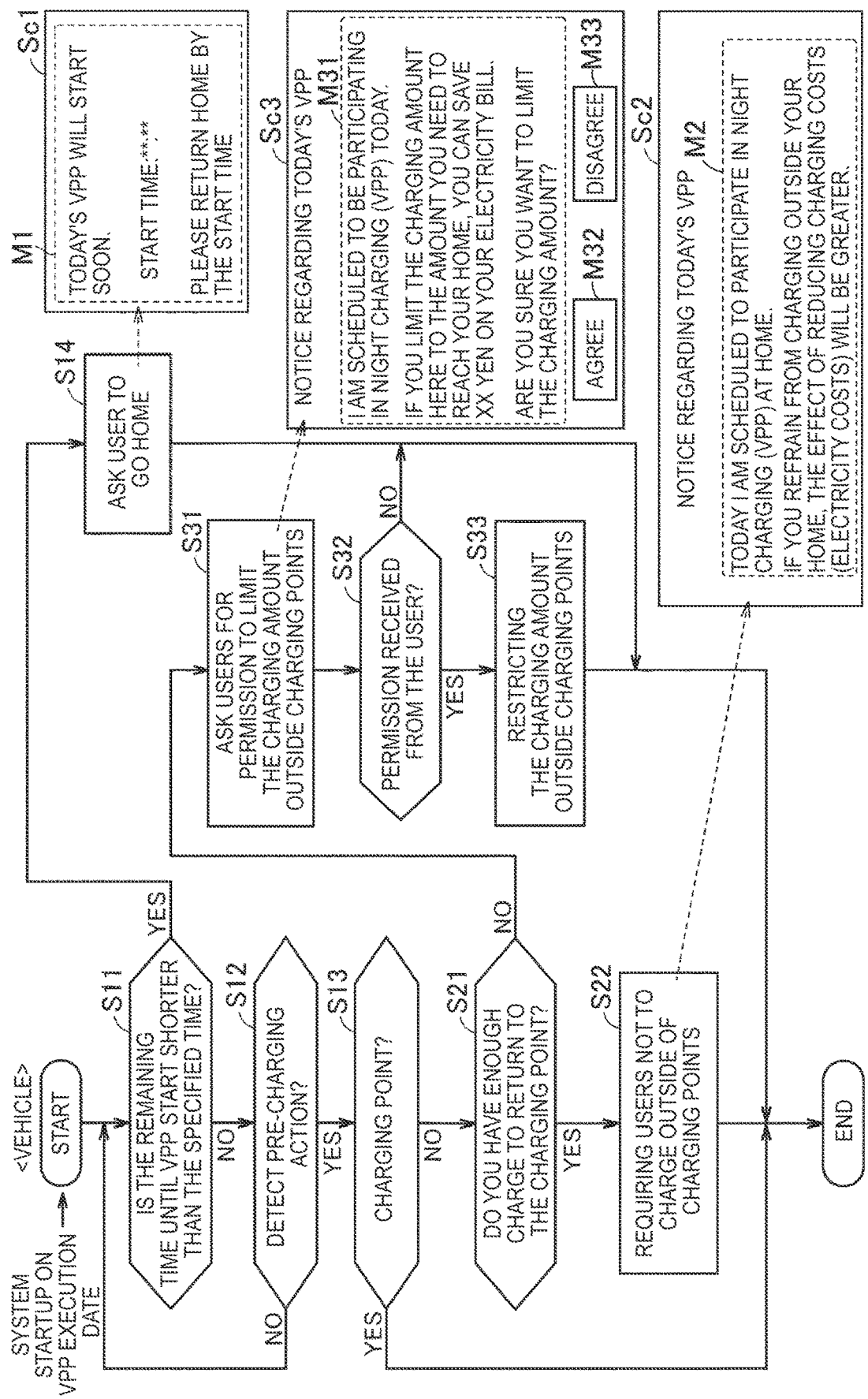

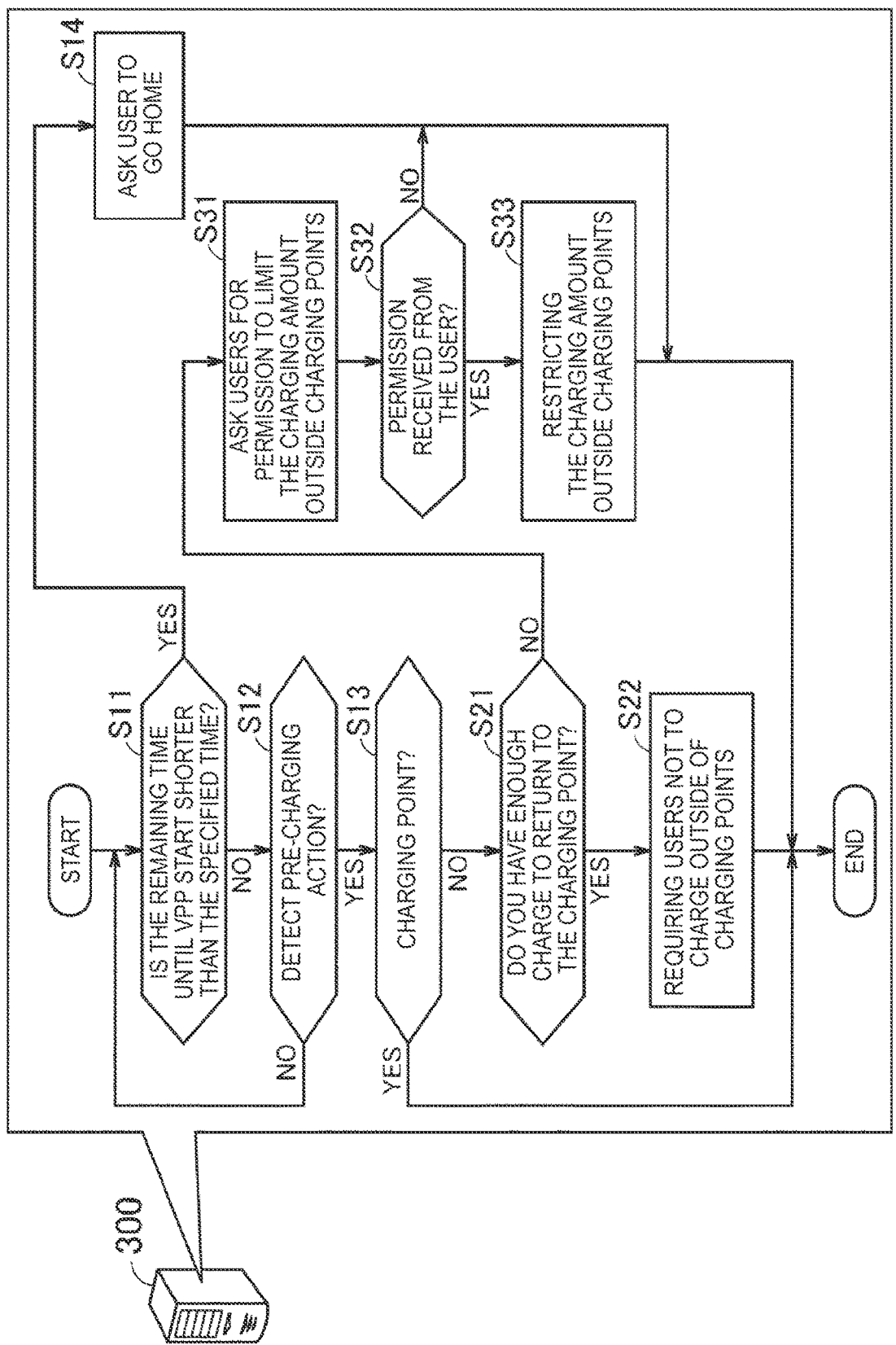

ENERGY MANAGEMENT METHOD AND COMPUTER SYSTEM

CROSS-REFERENCE TO RELATED APPLICATION

This application claims priority to Japanese Patent Application No. 2023-034637 filed on Mar. 7, 2023, incorporated herein by reference in its entirety.

BACKGROUND

1. Technical Field

The present disclosure relates to an energy management method and a computer system.

2. Description of Related Art

Japanese Unexamined Patent Application Publication No. 2016-171634 (JP 2016-171634 A) discloses a method of performing energy management using an electrified vehicle that has a power storage device.

SUMMARY

In the energy management method disclosed in JP 2016-171634 A, actions of a user are predicted, and based on results of the prediction, a charging schedule regarding the power storage device installed in the electrified vehicle (power supply schedule for the electrified vehicle) is managed. However, users do not necessarily act as predicted. Also, when the electrified vehicle is controlled so that the user can only act as predicted, there is a possibility that the user will be excessively inconvenienced.

The present disclosure has been made to solve the above problems, and it is an object thereof to realize both effectiveness of energy management and convenience of the user.

According to one aspect of the present disclosure, an energy management method is provided that includes scheduling charging of an electrified vehicle for energy management to be executed at a predetermined charging point on a predetermined execution date, determining, when a pre-charging action of the electrified vehicle is detected at a location other than the charging point on the execution date, whether the electrified vehicle will reach the charging point without being charged, and requesting a user of the electrified vehicle not to charge at a location other than the charging point, when determination is made that the electrified vehicle will reach the charging point even without charging at a location other than the charging point.

In the above method, determination is made regarding whether there is a possibility that charging will be executed at a location other than the charging point, based on the pre-charging action of the electrified vehicle. When there is a possibility that charging will be performed at a location other than the charging point (i.e., when the pre-charging action is detected at a location other than the charging point), determination is made regarding whether the electrified vehicle will reach the charging point even without charging. Demanding the user of the electrified vehicle not to charge at a location other than the charging point, even when the electrified vehicle cannot reach the charging point without charging at a location other than the charging point, may excessively inconvenience the user. Accordingly, in the above method, when determination is made that the electrified vehicle can reach the charging point without charging at a location other than the charging point, the user of the electrified vehicle is requested not to charge at a location other than the charging point. Thus, both effectiveness of energy management and convenience of the user can be realized.

According to another aspect of the present disclosure, a computer system is provided that includes one or more processors, and one or more storage devices for storing a program that causes the one or more processors to execute the above energy management method.

According to the above computer system, the energy management method described above is suitably executed. The computer system may include a plurality of processors installed in separate computers, and a plurality of storage devices installed in separate computers. For example, the computer system may include a first computer installed in a vehicle, and a second computer installed externally from the vehicle. The computer system may be implemented in the cloud.

According to the present disclosure, both effectiveness of energy management and user convenience can be realized.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 2 is a diagram showing the charging state of the electrified vehicle shown in FIG. 1;

FIG. 5 is a flowchart illustrating an energy management method according to an embodiment of the present disclosure;

FIG. 6 is a diagram showing a modification of the energy management method shown in FIG. 5.

DETAILED DESCRIPTION OF EMBODIMENTS

Figure 1:
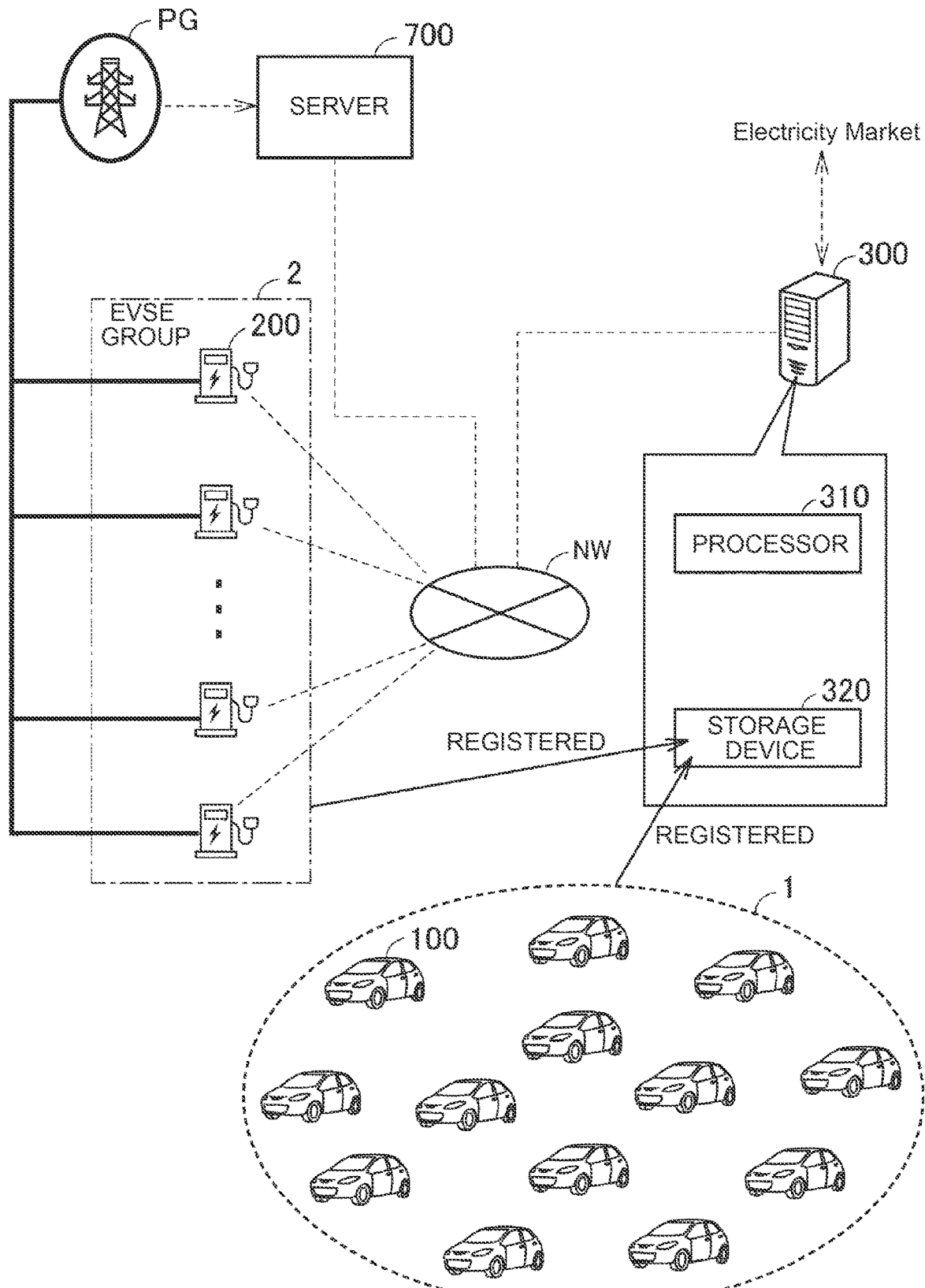
FIG. 1 is a diagram showing a schematic configuration of an energy management system according to an embodiment of the present disclosure.

An embodiment of the present disclosure will be described in detail with reference to the drawings. In the drawings, the same or corresponding parts are denoted by the same reference signs and the description thereof will not be repeated.

FIG. 1 is a diagram showing a schematic configuration of an energy management system according to an embodiment of the present disclosure. The energy management system according to this embodiment executes energy management of the power system PG. This energy management system includes a vehicle group 1, an EVSE group 2, and servers 300, 700. EVSE means Electric Vehicle Supply Equipment.

The power system PG is a power network constructed by power transmission and distribution facilities. A plurality of power plants is connected to the power system PG. Vehicle group 1 includes a plurality of electrified vehicles (xEV) that can operate as a regulating force for power system PG. EVSE group 2 includes a plurality of EVSEs supplied with power from power system PG.

Server 300 includes processor 310 and storage device 320. Server 300 may be a computer belonging to an aggregator. The server 700 belongs to, for example, the TSO (system operator) of the power system PG. Server 300 and server 700 are configured to be able to communicate with each other via communication network NW. The communication network NW is, for example, a wide area network constructed by the Internet and wireless base stations.

Each vehicle included in vehicle group 1 and each EVSE included in EVSE group 2 are both configured to communicate with server 300 via communication network NW. Each of these vehicles and each EVSE is registered with server 300. The storage device 320 stores information (for example, specifications, charging points, user information, incentive information, etc.) about each registered vehicle, distinguishing them by vehicle identification information (vehicle ID). In addition, the storage device 320 stores information (e.g., specifications, location information, etc.) about each registered EVSE, distinguishing them by EVSE identification information (EVSE-ID). The configuration of each vehicle included in vehicle group 1 (hereinafter referred to as "vehicle 100" when not distinguished) and each EVSE included in EVSE group 2 (hereinafter referred to as "EVSE 200" when not distinguished) will be described with reference to FIG. 2. FIG. 2 is a diagram showing the state of vehicle 100 during charging.

As shown in FIG. 2, vehicle 100 includes battery 110, inlet 120, charging circuit 130, electronic control unit (ECU) 150, and Human Machine Interface (HMI) 180 and a communication device 190. Vehicle 100 may further include an air conditioner (not shown). ECU 150 includes processor 151 and storage device 152. Vehicle 100 is an electrified vehicle (xEV) configured to run using electric power stored in battery 110. Vehicle 100 is, for example, a battery electric vehicle (BEV) without an internal combustion engine. As the battery 110, a known vehicle power storage device (a liquid secondary battery, an all-solid secondary battery, an assembled battery, etc.) can be employed. Examples of secondary batteries include lithium-ion batteries and nickel-metal hydride batteries.

Inlet 120 includes a charging port and a charging lid. The charging lid is configured to be openable and closable by the user, covering the charging port when closed and exposing the charging port when opened. When charging the battery 110, the connector 240 of the charging cable 230 is connected to the charging port while the charging lid is open. The charging circuit 130 is a circuit that charges the battery 110 using electric power supplied to the charging port from outside the vehicle. Charging circuit 130 is controlled by ECU 150. However, charging circuit 130 may charge battery 110 in response to a command from outside the vehicle. The charging of the battery 110 mounted on the vehicle 100 is hereinafter sometimes referred to as the charging of the vehicle 100.

HMI 180 includes a navigation system. Information set in the navigation system is hereinafter referred to as "navigation information". Examples of navigation information include travel routes and destinations. HMI 180 may include a touch panel display and/or a smart speaker that accepts voice input.

Detection values of various sensors (not shown) mounted on the vehicle 100 are input to the ECU 150. Vehicle 100 is equipped with a position sensor, a vehicle speed sensor, an accelerator sensor, an outside air temperature sensor, a battery sensor, a charging lid opening/closing sensor, a charging cable connection sensor, and the like. The position sensor may detect the position of the vehicle 100 using a positioning system such as the Global Positioning System (GPS). Battery sensors include various sensors that detect the state of battery 110 (e.g., voltage, current, temperature, and SOC). State of Charge (SOC) indicates the charging amount, and may indicate, for example, the ratio of the current charging amount to the charging amount in the fully charged state from 0 to 100%.

ECU 150 communicates with server 300 through communication device 190. Communication device 190 may include a wireless communication device (e.g., Data Communication Module (DCM)) that is accessible to communication network NW. Vehicle 100 sequentially transmits detection results from onboard sensors (for example, a position sensor and an SOC sensor) to server 300. Moreover, the latest navigation information is transmitted from the vehicle 100 to the server 300 every time the navigation information is updated.

The main body of EVSE 200 incorporates control section 210 and circuit section 220. EVSE 200 further comprises a charging cable 230 extending outwardly from the body of EVSE 200. Control unit 210 includes processor 211 and storage device 212 and controls circuit unit 220. Circuit unit 220 includes a circuit (for example, a power conversion circuit) that charges vehicle 100 (charges battery 110) using power supplied from power system PG. A connector 240 (plug) that can be attached to and detached from the charging port of inlet 120 is provided at the tip of charging cable 230. When connector 240 of charging cable 230 connected to the main body of EVSE 200 is connected to inlet 120 of parked vehicle 100, vehicle 100 is electrically connected to EVSE 200 (hereinafter, also referred to as a "plug-in state"). EVSE 200 and power system PG are electrically connected. Therefore, vehicle 100 in the plugged-in state is electrically connected to power system PG.

Figure 3:
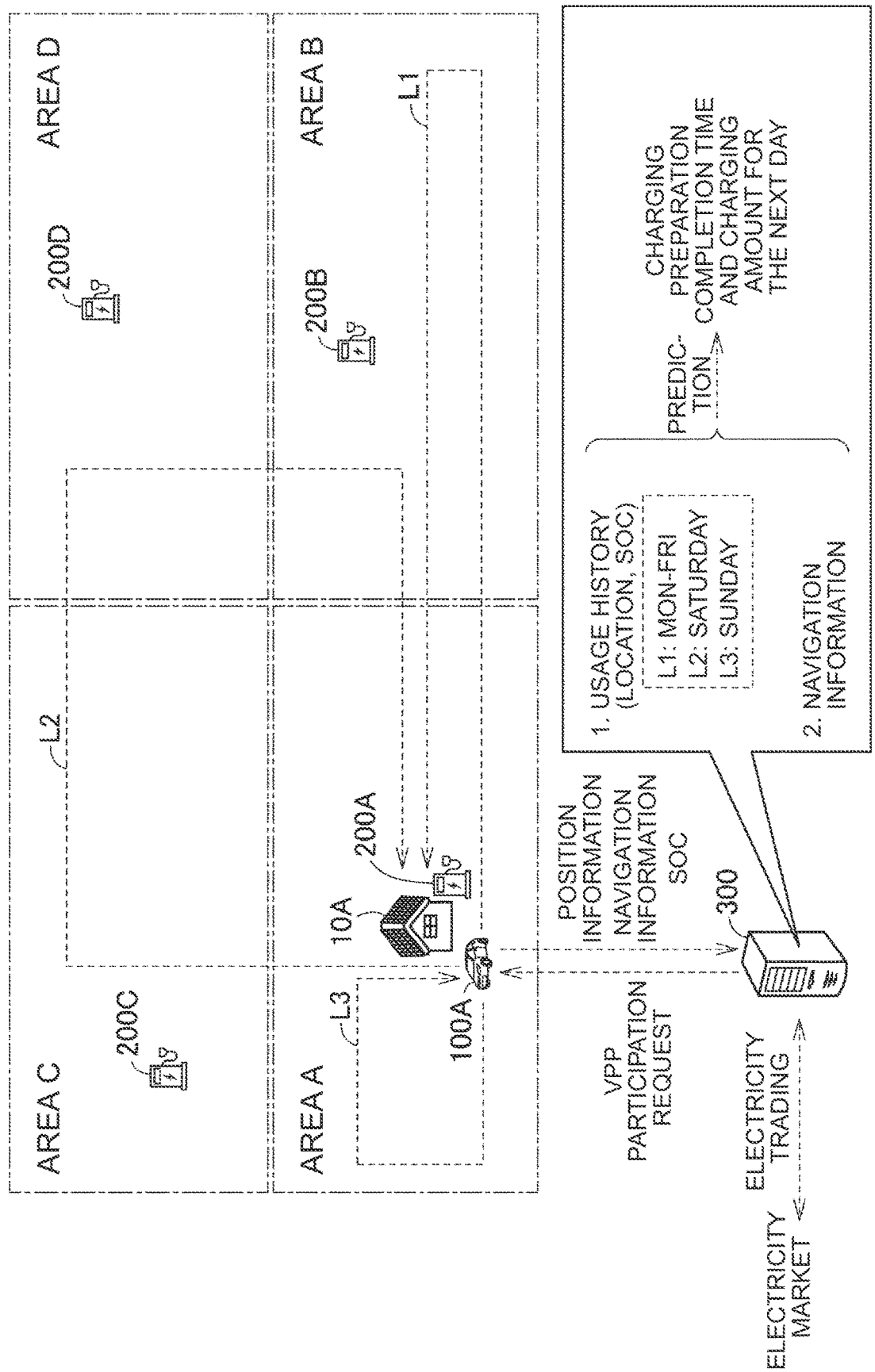
FIG. 3 is a diagram for explaining prediction of vehicle behavior by the server shown in FIG. 1 and electricity trading based on the prediction result.

The server 300 is configured to predict future behavior (usage mode) of the vehicle 100 from past usage data of the vehicle 100. A prediction program is implemented on the server 300. Then, the server 300 conducts power trading based on the prediction result. FIG. 3 is a diagram for explaining prediction of vehicle behavior by server 300 and electricity trading based on the prediction result. The EVSEs 200 existing in areas A, B, C, and D shown in FIG. 3 are hereinafter referred to as EVSEs 200A, 200B, 200C, and 200D, respectively. Also, the vehicle 100 belonging to the user living in the house 10A in the area A is referred to as "vehicle 100A". The EVSE 200A corresponds to power supply equipment installed in the house 10A (user's home). The position of the house 10A (EVSE 200A) is registered in server 300 as a charging point for vehicle 100A. In this embodiment, the charging point of each vehicle included in vehicle group 1 (e.g., the user's home and/or workplace) is registered with server 300.

In this embodiment, the user uses vehicle 100A for commuting. A user of vehicle 100A, for example, goes to work in the morning on weekdays and returns home in the evening of the same day. On weekdays, it is predicted that the vehicle 100A, which departs in the morning (for example, around 8:00 am) to go to work, returns home in the evening (for example, around 5:00 pm) and enters a plugged-in state. However, the user may behave irregularly.

Server 300 predicts the next day's charging preparation completion time and charging amount for the charging point of vehicle 100. The predicted charging preparation completion time is the time when vehicle 100 becomes ready for charging at the charging point. In this embodiment, the charging preparation completion time corresponds to the time when vehicle 100 leaves the charging point, returns to the charging point after traveling, is connected to EVSE 200, and enters the plug-in state. The predicted charging amount is the amount of electric power (kWh) stored in vehicle 100 by charging using EVSE 200 after completion of preparation for charging at the charging point, and is equivalent to the value that the charging amount at the start of charging is subtracted from the charging amount at the end of charging.

Server 300 may acquire information for the above prediction from vehicle 100. Specifically, the server 300 sequentially acquires various types of information (e.g., position information, SOC, and navigation information) from the vehicle 100, and records usage data of the vehicle 100 (e.g., data indicating the position and state of the vehicle 100 during travel) in the storage device 320. The usage data may include, for example, the position and SOC of vehicle 100 for each time.

Server 300, for example, uses the usage data (usage history) stored in storage device 320 to predict the next day's return time of vehicle 100A and the state of charge (SOC) of vehicle 100A at the return time. Server 300 may predict the charging amount of vehicle 100A for the next day based on the amount of power stored in vehicle 100A at the time of returning home the next day. Based on the usage history of vehicle 100A, server 300 can predict the next day's travel route and travel schedule, as well as the power consumption due to the next day's travel. The server 300 may predict the return home time from the predicted travel schedule. The server 300 may predict the power storage amount (remaining battery level) at the time of returning home from the predicted power consumption. Server 300 may manage the usage history of vehicle 100A for each day of the week, and predict the travel route and travel schedule based on the cumulative probability for each day of the week. In the example shown in FIG. 3, the server 300 manages usage histories separately for weekdays (Monday to Friday), Saturdays, and Sundays. Then, server 300 separately predicts weekday travel route L1, Saturday travel route L2, and Sunday travel route L3 based on the corresponding usage history. However, the prediction mode shown in FIG. 3 is only an example and can be changed as appropriate.

When server 300 receives the next day's navigation information from vehicle 100A, server 300 also considers the next day's navigation information and predicts the next day's return time and charging amount. When the navigation information of vehicle 100A is updated, there is a possibility that the user is scheduling irregular travel. Therefore, server 300 may rely more on the navigation information than on the usage history, and predict the return time and charging amount of vehicle 100A on the next day based on the next day's navigation information.

The server 300 can predict the charging preparation completion time from the time of returning home. Server 300 may estimate that vehicle 100A will be connected to EVSE 200A and will be in a plug-in state after a predetermined time (for example, 1 minute to 10 minutes) has passed since the time of returning home. HMI 180 may prompt the user to prepare for charging (e.g., plug in the vehicle) when vehicle 100A returns home.

In this embodiment, when vehicle 100 is connected to EVSE 200 at the charging point and enters a plug-in state, vehicle 100 will be allowed to receive charging control from EVSE 200 at the charging point (specifically, control unit 210 shown in FIG. 2). In this state, charging circuit 130 (vehicle charger) shown in FIG. 2 charges battery 110 according to instructions from EVSE 200. For example, in the house 10A, EVSE 200A receives prediction results for vehicle 100A from server 300. On days when energy management is not performed, EVSE 200A charges vehicle 100A based on the results predicted by server 300 (that is, charging preparation completion time and charging amount predicted on the previous day). For example, if vehicle 100A becomes chargeable in the house 10A before the predicted charge preparation completion time, charging of vehicle 100A may be started at the predicted charge preparation completion time. If vehicle 100A becomes chargeable in the house 10A after the predicted charging preparation completion time, charging of vehicle 100A may be started immediately (when charging becomes possible). Then, when the charging amount (kWh) of vehicle 100A reaches the predicted charging amount, charging of vehicle 100A may be terminated. However, the user of vehicle 100A can also operate the charging operation unit of vehicle 100A or EVSE 200A to cause EVSE 200A to operate and charge battery 110 regardless of instructions from EVSE 200A. In this case, the ECU 150 controls the charging circuit 130 according to instructions from the user.

The server 300 makes the predictions described above for each vehicle included in the vehicle group 1, and automatically conducts transactions (e.g., bidding and contracting) in the electric power market based on the prediction results. Then, the server 300 makes settlements for power transactions and manages books (transaction records). Below, tertiary balancing power-2 will be explained as an example of reserve that is successfully bid on the electricity market.

Figure 4:
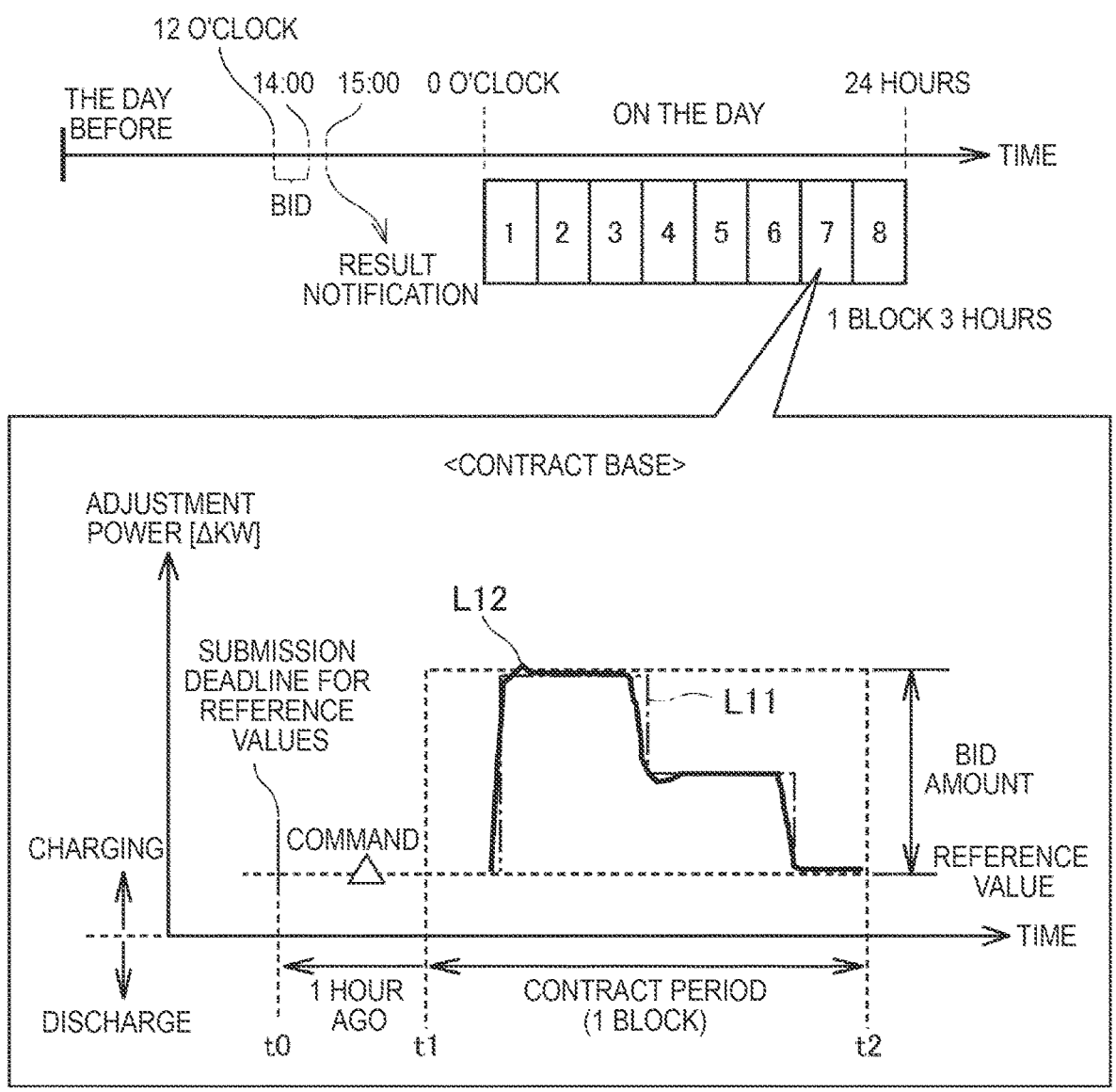
FIG. 4 is a diagram for explaining an overview of the tertiary balancing power-2.

FIG. 4 is a diagram for explaining an outline of the tertiary balancing power-2. Tertiary balancing power-2 is the reserve capacity for the Feed-in Tariff (FIT) special system and is traded in the supply and demand adjustment market. In the supply and demand adjustment market, electricity is traded as a product. Each product is bought and sold by, for example, a bidding method. The tertiary balancing power-2 corresponds to "Replacement Reserve for Feed-in Tariff (RR-FIT)", the response time is within 45 minutes, and the duration is 3 hours (6 frames). In the supply and demand adjustment market, a tertiary balancing power-2 is traded for each of eight blocks that divide a day into three-hour units.

The server 300 makes a bid in the supply and demand adjustment market during the period from 12:00 to 14:00 on the day before the target block. Specifically, the server 300 transmits bid information (i.e., information indicating bid conditions) including a product (for example, the tertiary balancing power-2), a block (one of the eight blocks), a coordination base in the target area, and a bid amount (ΔkW) to the supply and demand balancing market system. The number of coordination bases may be one or more. After that, the result is notified to the server 300 at 15:00 on the bid date. If the bid item is awarded, the contract is concluded. The ΔkW contracted amount corresponds to the successful bid amount. Those who win a bid for the tertiary balancing power-2 in the supply and demand adjustment market are obligated (contractual obligation) to adjust the power within the range of the bidding amount (bidding range) set for the reference value (kW).

In this embodiment, server 300 bids for tertiary balancing power-2. When the server 300 wins the bid, the reference value is registered in the supply and demand balancing market system by the submission deadline time t0 (for example, one hour before the start time of the target block for which the bid was made). In the example shown in FIG. 4, the reference value on the charging side is registered. The charging point specified by the bidding information is also registered in the supply and demand balancing market system as a balancing base. The server 300 sequentially receives from the server 700 the target value L11 arbitrarily requested by the server 700 within the successful bid range for the target block for which the bid was made (for example, from contract period t1 to t2). The server 300 controls charging at the charging point so that the actual charging power (actual value L12) at the charging point follows the target charging power (target value L11) from the server 700 during the contract period t1 to t2. When a plurality of charging points is specified by bidding information, server 300 controls charging at each charging point so that the total value of charging power at these charging points approaches the target charging power. The difference between the reference value (kW) and the actual value L12 (kW) corresponds to the control power (ΔkW) of the power system PG provided by the charging point. Penalty charges are imposed on the winning bidder if power adjustments that meet product requirements are not implemented.

As mentioned above, for tertiary balancing power-2, bidding will be conducted on the day before the energy management execution date. In this embodiment, on the premise that vehicle 100 will not be charged at a charging point other than the charging point (for example, the user's home) on the day before the execution date, server 300 predicts the charge preparation completion time and the charging amount of the vehicle 100 at the charging point on the execution date, and conducts power trading according to the prediction results. Server 300 determines the bid amount to allocate to a charging point based on the predicted charging amount for that charging point.

The server 300 is configured to bundle multiple distributed energy resources (hereinafter referred to as "DER") to realize a VPP (virtual power plant). VPP is a mechanism that functions as if it were a single power plant by remotely and integratedly controlling multiple DERs. For example, vehicle 100 electrically connected to EVSE 200 may serve as a DER for VPP. Based on the charging preparation completion time and charging amount predicted for each vehicle included in the vehicle group 1, the server 300 makes a schedule of charging of each vehicle for energy management performed at a predetermined charging point on a predetermined execution date. Specifically, the server 300 selects a plurality of vehicles from the vehicle group 1 having a charging point within the target area for which energy management is requested, based on the charging preparation completion time and charging amount predicted for each vehicle, and performs energy management using multiple selected vehicles. In power trading, the server 300 determines charging points for a plurality of vehicles and bidding amounts for the charging points based on the predicted total charging amount of each vehicle at the charging points. In the following, energy management for power grid PG is also referred to as "VPP".

When the product for which the bid for energy management in the time zone (VPP time zone) corresponding to the target block on the VPP execution date is won, the server 300 sends the user of each vehicle corresponding to each charging point specified at the time of bidding a request of charging to be performed at the registered charging point during the VPP time slot on the VPP execution date. This request is made the day before the VPP execution date. Each vehicle that has received the request sets the VPP execution date and VPP time slot in ECU 150. During the VPP time period on the VPP execution date server 300 transmits a charging command to EVSE 200 of each registered charging point based on the charging power requested by server 700 (see FIG. 2). EVSE 200 at each charging point receives a charging command from server 300 in real time and performs charging control (remote control) of vehicle 100 according to the charging command. Server 300 may give incentives (for example, points that can be exchanged for money or points that can be used to pay for electricity bills) to the user of vehicle 100 who has performed charging in response to a request.

In power trading, charging at a location other than the charging point is not certified as contracted charging (energy management). Therefore, if the vehicle 100 is charged at a location other than the charging point on that day (VPP execution date), there is a possibility that the charging amount will be insufficient for the contracted amount (amount of successful bids). Therefore, in this embodiment, vehicle 100 requested to be charged for energy management executes a series of processes shown in FIG. 5 explained below to try to achieve both the practicability of energy management and the user's convenience.

FIG. 5 is a flowchart showing an energy management method according to this embodiment. "S" in the flowchart means a step. The processing (processing flow) shown in this flowchart is started, for example, when the control system (including ECU 150) of vehicle 100 is activated on the VPP execution date set for vehicle 100. This processing flow ends when the vehicle system stops. When the vehicle system is restarted on the VPP execution date the process flow is started again. In the following, as an example, a case where a nighttime period (for example, from 6:00 PM to 9:00 PM) is set as the VPP time period for vehicle 100A shown in FIG. 3 will be described. Each process shown in FIG. 5 is executed by ECU 150 of vehicle 100A.

In S11 of FIG. 5, the ECU 150 determines whether the remaining time until the start of VPP is shorter than a predetermined time. The remaining time until the start of VPP corresponds to the time from the current time to the start time of the VPP time period (for example, 6:00 pm). If the remaining time until the start of VPP becomes shorter than the predetermined time, YES is determined in S11, and the process proceeds to S14. In S14, the ECU 150 requests the user of the vehicle 100A to return to the house 10A. Specifically, ECU 150 controls HMI 180 so that HMI 180 displays screen Sc1. The screen Sc1 includes a display portion M1 that displays the start time of energy management and a message prompting the user to return home. After the process of S14 is executed, the process flow of FIG. 5 ends.

On the other hand, if the remaining time until the start of VPP is equal to or longer than the predetermined time, a determination of NO is made in S11, and the process proceeds to S12. In S12, ECU 150 determines whether pre-charging action of vehicle 100A has been detected. In this embodiment, the vehicle 100A stops at a location where charging is executable (first action), the charging lid of the vehicle 100A opens (second action), and the destination of the vehicle 100A reaches a location where charging is executable. Setting (the third operation) corresponds to the pre-charging action. A location where charging is executable is, for example, a parking lot where an EVSE (power supply equipment) that can be used by the vehicle 100A is installed. For example, when the vehicle 100A stops at the parking lot of the house 10A in which the EVSE 200A is installed, the pre-charging action (first operation) is detected in S12. Further, in the navigation system of vehicle 100A, when a supermarket in which an EVSE that can be used by vehicle 100A is installed is set as the destination, a pre-charging action (third operation) is detected in S12. According to the first to third operations, it becomes easier to accurately detect the pre-charging action of the electrified vehicle. However, the pre-charging action is not limited to the above first to third operations as long as the vehicle is ready for charging. Also, only one (for example, only the second operation) or two (for example, the first and third operations) of the first to third operations may be adopted as the pre-charging action.

If the pre-charging action (any one of the first to third operations) is detected (YES in S12), ECU 150 determines in S13 whether the location where the pre-charging action is detected (position of vehicle 100A) is the charging point (house 10A). If the pre-charging action is detected at the charging point (YES in S13), the processing flow of FIG. 5 ends.

If the pre-charging action is detected at a location other than the charging point (NO in S13), the process proceeds to S21. In S21, the ECU 150 determines whether the vehicle 100A can reach the charging point (house 10A) without charging at that location (current position or destination). Specifically, ECU 150 determines the amount of electric power required for vehicle 100A to return to the house 10A (the amount of electric power consumed to the charging point) and the SOC (state of charge) of battery 110 at the current position or destination. Then, it is determined whether the vehicle 100A can travel to the house 10A without increasing the amount of electricity stored in the battery 110. ECU 150 may calculate the amount of power consumption to the charging point, taking into account the distance and elevation difference between the current position or destination and the charging point. The amount of power consumed to the charging point includes not only the amount of power consumed while the vehicle is running, but also the amount of power consumed by on-vehicle equipment (for example, an air conditioner) while the vehicle is running. The ECU 150 may estimate the amount of power consumed by the air conditioner while the vehicle is running based on the outside air temperature.

If it is determined that vehicle 100A can reach the charging point without charging at a location other than the charging point (YES in S21), ECU 150 instructs in S22 not to charge at a location other than the charging point. A request is made to the user of the vehicle 100A. Specifically, the ECU 150 controls the HMI 180 so that the HMI 180 displays the screen Sc2. Screen Sc2 includes a message informing the user that charging for energy management is scheduled for today, a message informing the user of incentives for energy management, and a message urging the user not to charge outside the home (house 10A). It includes a display portion M2 for displaying and. After the process of S22 is executed, the process flow of FIG. 5 ends.

If it is determined that vehicle 100A cannot reach the charging point without charging at a location other than the charging point (NO in S21), ECU 150 limits the charging amount at the location other than the charging point in S31. The user of the vehicle 100A is asked for permission to do so. Specifically, ECU 150 controls HMI 180 so that HMI 180 (touch panel display) displays screen Sc3. The screen Sc3 displays a message informing the user that charging for energy management is scheduled for today, a message informing the user of incentives for energy management, and a message requesting permission from the user to limit the charging amount. A display portion M31 is included. The screen Sc3 further includes an operation unit M32 for permitting limitation of the charging amount in response to a request, and an operation unit M33 for rejecting the request.

In subsequent S32, the ECU 150 determines whether or not the above permission has been received from the user of the vehicle 100A. The user can reject the request from the ECU 150 by operating the operation unit M33. If the user rejects the request (NO in S32), the processing flow of FIG. 5 ends. Further, the user can allow the ECU 150 to limit the charging amount by operating the operation unit M32. When ECU 150 receives permission from the user of vehicle 100A (user operation on operation unit M32) (YES in S32), ECU 150 limits the charging amount at locations other than the charging point in subsequent S33. In this embodiment, the charging amount (kWh) until the charging amount of the battery 110 reaches the power consumption amount (see S21) to the charging point described above is set in the ECU 150 as the upper limit value of the charging amount. However, without being limited to this, the charging amount until the amount of power obtained by adding a predetermined allowance to the amount of power consumed to the charging point is stored in battery 110 may be set in ECU 150 as the upper limit value of the charging amount.

A user of vehicle 100A can charge battery 110 by operating a charging operation unit of vehicle 100A or EVSE (electric power supply equipment) even at locations other than the charging point. That is, the user of vehicle 100A can charge battery 110 not only at home but also while going out. In this case, the ECU 150 controls the charging circuit 130 according to instructions from the user. However, when the upper limit of the charging amount is set in the ECU 150, the ECU 150 controls the charging circuit 130 so that the charging amount does not exceed the upper limit. When the charging amount in battery 110 reaches the upper limit, charging of battery 110 ends.

As described above, the energy management method according to this embodiment includes the processes shown in FIGS. 3 to 5. Each process is executed by one or more processors executing programs stored in one or more memories. However, these processes may be executed by dedicated hardware (electronic circuitry) instead of software.

The energy management method according to this embodiment includes scheduling charging of an electrified vehicle for energy management at a predetermined charging point on a predetermined execution date (see FIGS. 3 and 4); determining whether the electrified vehicle can reach the charging point without being charged (S21 in FIG. 5) when the pre-charging action of the electrified vehicle was detected at a location other than the charging point on the execution date; requesting the user of the electrified vehicle not to charge the vehicle at a location other than the charging point (S22 in FIG. 5) when it is determined that the electrified vehicle can reach the charging location without charging at a location other than the charging point. According to such a method, it is possible to achieve both the practicability of energy management and the user's convenience. In addition, by improving the efficiency of energy management by electrified vehicles, it will be easier to increase the volume of electricity trading and increase profits. In addition, the display of incentives can motivate the user to participate in energy management. Instead of incentives, environmental effects (for example, carbon dioxide emission reduction amount) by energy management may be displayed.

Restricting the charging amount of the electrified vehicle even when the user does not want to limit the charging amount may excessively impair the user's convenience. Therefore, in the above energy management method, when it is determined that the electrified vehicle cannot reach the charging point without charging at a location other than the charging point, it further includes requesting the user of the electrified vehicle to allow to limit the charging amount at the location other than the charging point (S31 in FIG. 5), and limiting the charging amount at the location other than the charging point when permission is received from the user of the electrified vehicle (S33 in FIG. 5). These methods require permission from the user of the electrified vehicle prior to limiting the charging amount. Thus, both effectiveness of energy management and convenience of the user can be realized. In addition, by not excessively limiting the charging amount of the electrified vehicle at location other than the charging point, the lack of electricity of the electrified vehicle is suppressed.

The above energy management method further involves predicting the charging preparation completion time and charging amount of the electrified vehicle for the next day at the charging point (see FIG. 3), and charging the electrified vehicle at the charging point based on the charging preparation completion time and charging amount predicted on the previous day (see FIG. 2). According to such a method, the charge preparation completion time and charging amount of the electrified vehicle are predicted the day before, and the electrified vehicle is charged based on the prediction result. Therefore, it becomes easier to make a schedule for energy management.

Requests to the vehicle user (S14, S22, S31 in FIG. 5) may be made by a user terminal (for example, a communication device having a user interface) outside the vehicle instead of the in-vehicle HMI (HMI 180). Examples of user terminals outside the vehicle include smartphones, portable game machines, wearable devices (for example, wristwatch-type communication devices), and electronic keys. The request to the vehicle user may be made audibly rather than visually.

Server 300 may execute the series of processes shown in FIG. 5 instead of the vehicle. FIG. 6 is a diagram showing an example of the server 300 executing the series of processes shown in FIG. 5. Server 300 may request vehicle 100 to notify the vehicle user. Server 300 may receive an answer from the vehicle user from vehicle 100. Server 300 may request the second electrified vehicle to execute energy management instead of the first electrified vehicle when the request for charging amount limitation is rejected in the first electrified vehicle (NO in S32).

The processing flow shown in FIG. 5 or 6 can be changed as appropriate. For example, the order of processing may be changed, or unnecessary steps may be omitted, depending on the purpose. Also, the content of any one of the processes may be changed. For example, S11 and S14 may be omitted. When vehicle 100 starts running or ends running (for example, when a start switch of vehicle 100 is turned on or off), the determination (S12) regarding the pre-charging action of vehicle 100 may be executed.

In the above-described embodiment, a prediction program for predicting the future usage of vehicle 100 from past usage data of vehicle 100 is implemented in server 300 (on-premises server) (see FIG. 3). However, the present disclosure is not limited to this, and instead of the server 300, such a prediction program may be implemented in the vehicle 100, the EVSE 200, or the Energy Management System (EMS) of the house 10A. Also, the functions of the server 300 may be implemented on the cloud.

The configuration of the electrified vehicle used for energy management is not limited to the configuration described above (see FIG. 2). xEVs other than BEVs may be employed, for example, plug-in hybrid electric vehicles (PHEVs) with internal combustion engines may be employed. The electrified vehicle may be configured for contactless charging. An electrified vehicle that performs contactless charging may be considered to be entered in a state corresponding to the "plug-in state" described above when alignment between the power transmission unit (e.g., power transmission coil) on the power supply equipment side and the power reception unit (e.g., power reception coil) on the vehicle side is completed. The electrified vehicle is not limited to a four-wheel passenger car, but may be a bus or truck, or a three-wheel xEV.

The embodiments disclosed herein should be considered to be exemplary and not restrictive in all respects. The scope of the present disclosure is shown by the scope of claims rather than the description of the above embodiment, and is intended to include all modifications within the meaning and the scope equivalent to the scope of claims.

What is claimed is:

1. An energy management method executed by a server and an electrified vehicle including a battery and a charging circuit, the energy management method comprising:
   scheduling, by the server, charging of the battery under an energy management program to be executed at a predetermined charging point on a predetermined execution date;
   determining, by the electrified vehicle, whether the electrified vehicle is able to reach the predetermined charging point without charging the battery, in response to detecting a pre-charging action of the electrified vehicle at a different location other than the predetermined charging point on the predetermined execution date;
   causing, by the electrified vehicle, a display device of the electrified vehicle to display a notification in response to the determination that the electrified vehicle is able to reach the predetermined charging point even without charging the battery at the different location, the notification encouraging a user of the electrified vehicle to avoid charging the battery at the different location;
   causing, by the electrified vehicle, the display device to display a message requesting an approval from the user in response to the determination that the electrified vehicle is not able to reach the predetermined charging point without charging the battery, the approval indicating that the user agrees to a limit on a charging amount at the different location;
   determining, by the electrified vehicle, an upper limit value of charging the battery at the different location in response to the approval from the user, the upper limit value being determined based on a power consumption required for the electrified vehicle to reach the predetermined charging point; and
   controlling, by the electrified vehicle, the charging circuit to start charging the battery at the different location after reaching the different location and to stop charging the battery at the different location in response to a state of charge of the battery reaching the determined upper limit value.

2. The energy management method according to claim 1, wherein the pre-charging action includes at least one of stopping the electrified vehicle at a location where charging is executable, opening a charging lid of the electrified vehicle, and setting a destination of the electrified vehicle to a location where charging is executable.

3. The energy management method according to claim 1, further comprising:
   predicting, by the server, a charging preparation completion time and a charging amount by which to charge the battery at the predetermined charging point on a following day; and
   causing, by the server, charging equipment provided at the predetermined charging point to charge the battery based on the charging preparation completion time and the predetermined charging amount predicted on a previous day when the electrified vehicle does not have a plan to join the energy management program.

4. A computer system comprising:
one or more processors; and
one or more storage devices for storing a program that causes the one or more processors to execute the energy management method according to claim 1.

* * * * *